United States Patent
Fleuret et al.

(10) Patent No.: US 8,615,107 B2
(45) Date of Patent: Dec. 24, 2013

(54) METHOD AND APPARATUS FOR MULTIPLE OBJECT TRACKING WITH K-SHORTEST PATHS

(75) Inventors: François Fleuret, Yverdon-les-Bains (CH); Jérôme Berclaz, Mollens (CH); Engin Türetken, Ecublens (CH); Pascal Fua, Vaux-sur-Morges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 152 days.

(21) Appl. No.: 13/348,331

(22) Filed: Jan. 11, 2012

(65) Prior Publication Data

US 2013/0177200 A1    Jul. 11, 2013

(51) Int. Cl.
*G06K 9/00*    (2006.01)

(52) U.S. Cl.
USPC ........................................................ 382/103

(58) Field of Classification Search
USPC .................................................. 382/100, 103
See application file for complete search history.

(56) References Cited

U.S. PATENT DOCUMENTS

2009/0312985 A1* 12/2009 Eliazar ........................... 702/187
2011/0085702 A1* 4/2011 Nevatia et al. ................ 382/103
2011/0226889 A1* 9/2011 Rovinsky ..................... 244/3.11

OTHER PUBLICATIONS

H. Jiang et al., A Linear Programming Approach for Multiple Object Tracking, 2007, Univ. of British Columbia, 8 pages.
J. Berclaz et al., Multiple Object Tracking Using K-Shortest Paths Optimization, *IEEE Transactions on Patterns Analysis and Machine Intelligence*, vol. 33, No. 9, pp. 1806-1819, Sep. 2011.

* cited by examiner

*Primary Examiner* — Shefali Goradia
(74) *Attorney, Agent, or Firm* — Blank Rome LLP

(57) ABSTRACT

Trajectories of objects are estimated by determining the optimal solution(s) of a tracking model on the basis of an occupancy probability distribution. The occupancy probability distribution is the probability of presence of objects over a set of discrete points in the spatio-temporal space at a number of time steps. The tracking model is defined by the set of discrete points, a virtual source location and a virtual sink location, wherein objects in the tracking model are creatable in the virtual source location and are removable in the virtual sink location.

53 Claims, 5 Drawing Sheets

METHOD AND APPARATUS FOR MULTIPLE OBJECT TRACKING WITH K-SHORTEST PATHS

REFERENCE DATA

The content of the recent publication "Multiple Object Tracking using K-shortest Paths Optimization" in IEEE TRANSACTIONS ON PATTERN ANALYSIS AND MACHINE INTELLIGENCE by the inventors J. Berclaz, F. FLeuret, E. Türetken and P. Fua are hereby incorporated.

FIELD OF THE INVENTION

The present invention concerns a method of tracking multiple objects, a tracking apparatus for tracking multiple objects and a program for tracking multiple objects.

DESCRIPTION OF RELATED ART

Multi-object tracking can be decomposed into two separate steps that address independent issues. The first is time-independent detection, in which a prediction scheme infers the number and locations of targets from the available signal at every time step independently. It usually involves either a generative model of the signal given the target presence or a discriminative machine learning-based algorithm. The second step relies on modeling detection errors and target motions to link detections into the most likely trajectories. The invention relates to the second step.

In theory, at least, such an approach is very robust to the occasional detection failure. For example, false positives are often isolated in time and can readily be discarded. Similarly, if an object fails to be detected in a frame but is detected in previous and following ones, a correct trajectory should nevertheless be produced.

However, while it is easy to design a statistical trajectory model with all the necessary properties for good filtering, estimating the family of trajectories exhibiting maximum posterior probability is NP-Complete. This has been dealt with in the state of the art either by sampling and particle filtering, linking short tracks generated using Kalman filtering, or by greedy Dynamic Programming in which trajectories are estimated one after another. While effective, none of these approaches guarantees a global optimum. A notable exception is a recent approach published by H. Jiang, S. Fels and J. Little, in the article "A Linear Programming Approach for Multiple Object Tracking" in Conference on Computer Vision and Pattern Recognition, 2007, pp. 744-750. This approach relies on Linear Programming to find a global optimum with high probability, but at the cost of a priori specifying the number of objects being tracked and restricting the potential set of locations where objects can be found to those where the detector has fired. The former is restrictive while the latter is fine as long as the detector never produces false-negatives but may lead to erroneous trajectories in the more realistic case where it does.

For a detailed description of the methods of the state of the art mentioned above "Multiple Object Tracking using K-shortest Paths Optimization" in IEEE TRANSACTIONS ON PATTERN ANALYSIS AND MACHINE INTELLIGENCE by J. Berclaz, F. FLeuret, E. Türetken and P. Fua is referred to.

BRIEF SUMMARY OF THE INVENTION

It is object of the present invention to overcome the above mentioned disadvantages, especially to use a linear programming approach for multiple object tracking which allows a variable number of objects and wherein the object detection space is not restricted.

It is a further object of the present invention to efficiently find the most likely trajectories of the multiple objects given the detection data.

According to the invention, these aims are achieved by a method for tracking objects according to claim 1. The Method for tracking objects compress the following steps. Trajectories of objects are estimated by determining the optimal solution(s) of a tracking model, preferably the most likely one of a set of solutions of a tracking model on the basis of an occupancy probability distribution. The occupancy probability distribution is the probability of presence of objects over a set of discrete points in the spatio-temporal space at a number of time steps. The tracking model is defined by said set of discrete points, a virtual source location and a virtual sink location, wherein objects in the tracking model are creatable in the virtual source location and are removable in the virtual sink location. In addition, the tracking model fulfils the following constraints. A created object is only allowed to move from the virtual source location to a source subset of the set of discrete points. An object is only allowed to move from each discrete point to a predetermined neighbourhood set of said discrete point, wherein the neighbourhood set comprises a subset of the set of discrete points. An object is only allowed to move from a sink subset of the set of discrete points to the virtual sink location. The number of objects moving to each discrete point is equal to the number of objects moving away from this discrete point. The number of objects moving away from or moving to one discrete point is smaller or equal to one. The number of objects moving from each discrete point to another discrete point is zero or positive and any object created in the virtual source location eventually has to end up in the virtual sink location.

According to the invention, these aims are achieved by a tracking apparatus for tracking objects according to claim 21. Tracking apparatus according to claim 21 comprises an interface for receiving said occupancy probability distribution. A modelling section of the tracking apparatus stores a tracking model as defined above. An trajectory estimator of the tracking apparatus estimates trajectories of objects by determining the optimal solution(s), such as the most likely one of a set of solutions of the tracking model on the basis of said occupancy probability distribution.

The advantage of the invention is that a tracking model is defined which allows that the number of the objects varies and allows their estimation. In addition, the trajectories of all objects are estimated on the basis of a maximum likelihood approach. Therefore, the optimal estimator given the occupancy probability distribution is determined. Finally, the estimator of said tracking model is linear and is therefore exactly determinable without using uncertain nonlinear maximization or minimization algorithms. Therefore, the optimal estimator for trajectories of a variable number of objects can be determined exactly.

The dependent claims refer to further embodiments of the invention.

According to a one embodiment, an estimator for the optimal, most likely one of a set of solutions of the tracking model is based on the functions $$\left(\log \frac{\rho_i}{1-\rho_i}\right)$$

for the discrete points i=1, . . . , wherein L is the number of discrete points of the set of discrete points and $\rho_i$ is the probability of presence of an object at the discrete point $i=1, \ldots, L$ resulting from the occupancy probability distribution.

This estimator is determined for example by finding an $\vec{m}^* \epsilon F$ of a function being based on $$\sum_i \left(\log \frac{\rho_i}{1-\rho_i}\right) \cdot m_i$$

which yields an extremum of said function, wherein F is the set of feasible solutions $\vec{m}$ of the tracking model, $\vec{m}$ is a vector of variables $m_i$ of presence of an object at the discrete point $i=1 \ldots, L$.

Alternatively, the estimator is determined by finding an $\vec{f}^* \epsilon H$ of a function being based on $$\sum_i \left[\left(\log \frac{\rho_i}{1-\rho_i}\right) \cdot \sum_{j \in N(i)} f_{i,j}\right]$$

which yields an extremum of said function, wherein H is the set of feasible solutions $\vec{f}$ of the tracking model, $\vec{f}$ is a vector of variables $f_{i,j}$ with $i=1, \ldots, L$, $f_{i,j}$ is the number of objects moving from discrete point j to discrete point j and N(i) is the neighbourhood set of the discrete point i. This alternative has the advantage, that the constraints and the argument of the optimization problem are both expressed by flows. Therefore, the problem can be handled much better by a computer or processor. The constraints of the tracking model are preferably considered by the following formulas $$\forall i, j, f_{i,j} \geq 0$$

$$\forall i, \sum_{j \in N(i)} f_{i,j} \leq 1$$

$$\forall i, \sum_{j \in N(i)} f_{i,j} - \forall i, \sum_{n:i \in N(n)} f_{n,i} \leq 0$$

$$\sum_{j \in N(v_{source})} f_{v_{source},j} - \sum_{n:v_{sink} \in N(n)} f_{n,v_{sink}} \leq 0,$$

wherein $N(v_{source})$ is the source subset, $n{:}v_{sin\ k} \epsilon N(n)$ is the sink subset, $f_{v_{source},j}$ is the number of objects moving from the virtual source location to the discrete point i of the source subset and $f_{n,v_{sin\ k}}$ is the number of objects moving from the discrete point n to the virtual sink location $v_{sin\ k}$. The use of the inequalities is completely consistent with the constraints defined in the invention. The advantage of using inequalities is that the handling for a computer or processor is better.

In both described embodiments, the flows $\vec{f}$ or the occupancy maps $\vec{m}$ are discrete variables. Optimization problems with discrete variables are NP complete and therefore very inefficient. Therefore, in a further embodiment instead of a integer linear program solver a continuous linear program solver is used for finding $\vec{f}^*$ or $\vec{m}^*$. It can be shown that in the case of the present tracking model, the solution of the continuous linear program still converges versus the integer solution. Therefore, by this embodiment, the correct solution can be determined in a more efficient way.

In a further embodiment, the estimator is determined by formulating the tracking model as a directed acyclic graph with the discrete points, the virtual sink location and the virtual source location as vertices and the allowed movements of the objects as directed edges and by finding the k shortest or k longest node-disjoint paths between the virtual source location and the virtual sink location, wherein k is the number of objects being tracked in the model and wherein the edge between the discrete point i and the discrete point j at is weighted by a cost function being based on the term $$\log\left(\frac{\rho_i}{1-\rho_i}\right).$$

This embodiment yields the same solution as the previous methods. However, the k shortest/longest node-disjoint paths can be determined much faster. This embodiment improves the velocity of the estimation of the trajectories of objects such that real time applications are possible.

In this application, node-disjoint paths are defined as paths that do not intersect at any graph vertex except possibly at those that correspond to the virtual source and the virtual sink locations.

In this embodiment, the cost function should be directly proportional to $$-\log\left(\frac{\rho_i}{1-\rho_i}\right)$$

and the estimator would be determined by finding the k shortest node-disjoint paths between the virtual source location and the virtual sink location. However, the cost function could also be directly proportional to $$\log\left(\frac{\rho_i}{1-\rho_i}\right)$$

and the estimator would then be determined by finding the k longest node-disjoint paths between the virtual source location and the virtual sink location.

In this embodiment, an estimator k* for the number of objects being tracked in the model is determined on the basis of a change of signs between a sum of all weights of a k shortest/longest node-disjoint path and a sum of all weights of a k+1 shortest/longest node-disjoint path.

In this embodiment, it is especially advantageous that the edges from the virtual source location to the source subset and the edges from the sink subset to the virtual sink location are weighted by a cost function equal to zero. This has the consequence that objects can be created and removed in the tracking model without any costs.

In one embodiment, the source subset comprises the discrete points corresponding to the first time step. This has the advantage that objects can be tracked even if they are already in the tracking zone.

In one embodiment, the source subset comprises a predetermined strict subset of the set of discrete points. This has the advantage that the objects can only be enter and exit the tracking zone at this strict subset of discrete points. If these discrete points of the strict subset correspond to the entering/exiting points of the tracking zone, e.g. doors or the border zones of the tracking area, objects can be only created/removed in the tracking model at discrete points where even in reality objects can enter/exit the tracking zone.

In one embodiment of the invention, the predetermined neighbourhood set of each discrete point comprises the discrete points of the next time step being spatially closest to the discrete point corresponding to the predetermined neighbourhood set. With this constraint, the tracking model respects the real world constraint that objects can within one time step reach only a number of locations being closest to the present location. Depending on the velocity of the objects and the length of one time step, the size of the neighbourhood set has to determined.

In one embodiment, the predetermined neighbourhood set of the discrete points being element of the sink subset comprises the virtual sink location. By this constraint, the tracking model automatically ensures that objects can also move from the sink subset to the virtual sink location.

In one embodiment, the set of discrete points is reduced on the basis of the occupancy probability distribution. This can be performed by removing the discrete points having in a predetermined spatio-temporal neighbourhood a maximum probability of presence of an object resulting from the occupancy probability distribution lower than a predetermined threshold. This increases further the velocity of the tracking method, since the number of discrete points of the tracking model is reduced.

The method for tracking objects comprises the following steps. Trajectories of objects are estimated by determining the optimal solution(s) of a tracking model on the basis of an occupancy probability distribution. The occupancy probability distribution is the probability of presence of objects over a set of discrete points in the spatio-temporal space at a number of time steps. The tracking model is defined by said set of discrete points, a virtual source location and a virtual sink location, wherein objects in the tracking model are creatable in the virtual source location and are removable in the virtual sink location. In addition, the tracking model fulfils the following constraints. A created object is only allowed to move from the virtual source location to a source subset of the set of discrete points. An object is only allowed to move from each discrete point to a predetermined neighbourhood set of said discrete point, wherein the neighbourhood set comprises a subset of the union of the set of discrete points and the virtual sink location. An object is only allowed to move from a sink subset of the set of discrete points to the virtual sink location. The number of objects moving to each discrete point is equal to the number of objects moving away from this discrete point. The number of objects moving away from or moving to one discrete point is smaller than or equal to one. The number of objects moving from each discrete point to another discrete point is zero or positive and any object created in the virtual source location eventually has to end up in the virtual sink location.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
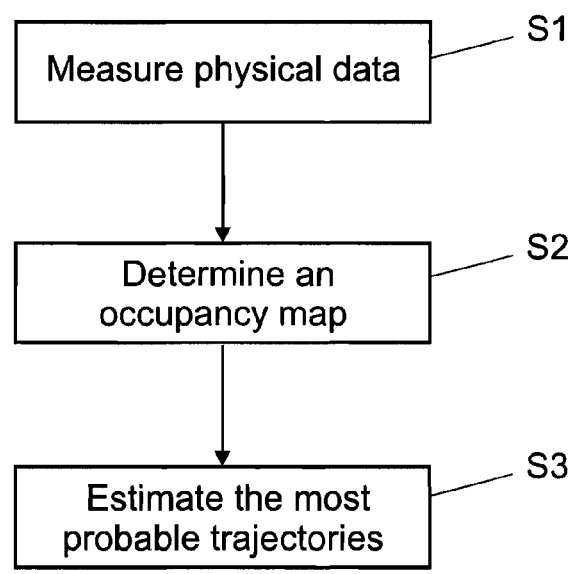
FIG. 1 shows a diagram of the step of the method according to the invention.

FIG. 1 shows the steps of a method for tracking multiple objects according to the invention. In step S1, physical data $I^t$ of the physical area of interest are measured by a detector for each time step t of a number of subsequent time steps T. The physical area of interest is the physical area wherein moving objects shall be detected. The physical area of interest will be called in the following tracking area. Normally one image or a plurality of images of the tracking area is taken at each time step t by one or a plurality of cameras as detector. The images could be taken by several cameras at distinct location in order to improve the physical data $I^t$ for detecting the objects. The tracking area could be for example the physical area covered by an image captured by one camera. The physical data $I^t$ can be captured by detecting any kind of electromagnetic waves like infrared, visual light, radar waves etc. or even by sound waves.

In a second step S2, an occupancy probability distribution is determined on the basis of said physical data $I^t$ which will be described later in detail. In a third step S3, the trajectories of objects are determined on the basis of the determined occupancy probability distribution and a tracking model.

Before describing the steps S2 and S3 in detail, the tracking model according to the invention will be presented. The tracking area is discretized into K locations, and the time interval into T instants. For any location i, let $N(i) \subset \{1, \ldots, K\}$ denote the neighbourhood set of i, that is, the locations an object located at i at time t can reach at time t+1.

To model occupancy over time, let us consider a labeled directed graph with KT vertices, which represents every location at every instant. Its edges correspond to admissible object motions, which means that there is one edge from $e_{i,j}^t$ from (t,i) to (t+1,j) if, and only if, $j \in N(i)$. To allow objects to remain static, in the best mode there is an edge from a location j at time t to itself j at time t+1. The KT vertices represent a set of KT discrete points in the spatio-temporal space.

The neighbourhood set $j \in N(i)$ of each location i of one time step in the best mode of the invention comprises the same location i at the next time step and a number of locations j at the next time step being closest to the same location i. This can be determined by a parameter which points out a number of closest location or a certain spatio-regional distance. However, the invention is not restricted to the best mode. The neighbourhood set could also comprise all K locations of the next time step. Certainly, the neighbourhood set of each discrete point i could also comprise any strict subset of the set of discrete points being in a future spatio-temporal neighbourhood, that is, the set of discrete points being in the future of discrete point j and being within a predetermined spatio-temporal surrounding area of j.

Each vertex is labeled with a discrete variable $m_i^t$ standing for the number of objects located at i at time t or in other words at the discrete point of the spatio-temporal space defined in the tracking model by i and t. $m_i^t$ is a discrete variable with two states, one representing that no object is present at the vertex, e.g. 0, and the other that one object is present at the vertex, e.g. 1. The set of all KT discrete variables $m_i^t$ form $\vec{m} = \{m_i^t | i=1, \ldots, K; t=1, \ldots, T\}$ which is also called the occupancy map. Each edge is labeled with a discrete variable $f_{i,j}^t$ standing for the number of objects moving from location i at time t to location j at time t+1. For instance, the fact that an object remains at location i between times t and t+1 is represented by $f_{i,i}^t=1$. Given these definitions, for all t, the sum of flows arriving at any location j is equal to $m_j^t$, which also is the sum of outgoing flows from location j at time t. Therefore $$\forall j,t, \sum_{i:j\in N(i)} f_{i,j}^{t-1} = m_j^t = \sum_{n\in N(j)} f_{j,n}^t \qquad (1)$$

holds.

Furthermore, since a location cannot be occupied by more than one object at a time step, an upper-bound of 1 can be set to the sum of all outgoing flows from a given location and $$\forall i,t \sum_{j\in N(i)} f_{i,j}^t \leq 1 \qquad (2)$$

holds.

A similar constraint applies to the incoming flows, but it is not need to explicitly state it, since it is implicitly enforced by equation (1). Finally, the flows have to be non-negative and $$\forall i,j,t, f_{i,j}^t \geq 0 \qquad (3)$$

holds.

Figure 2A:
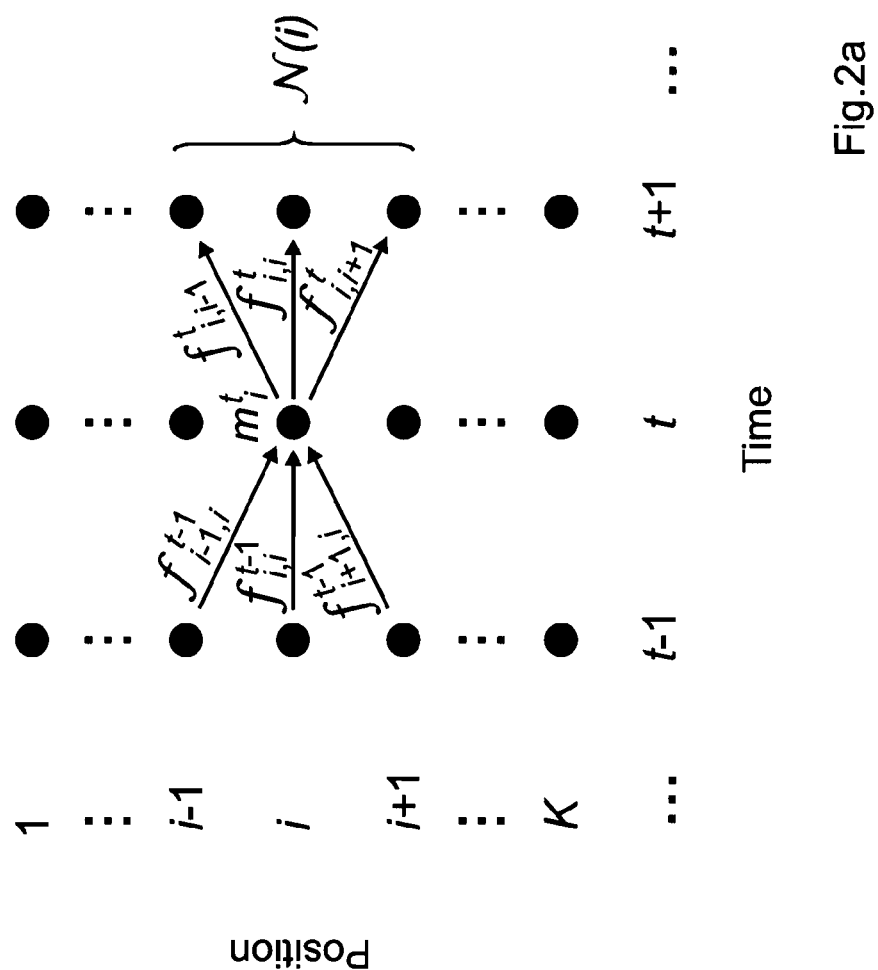
FIG. 2A shows some discrete points of a tracking model and the allowed movements to and away from one discrete point, wherein the discrete points are shown in a vector arrangement.
Figure 2B:
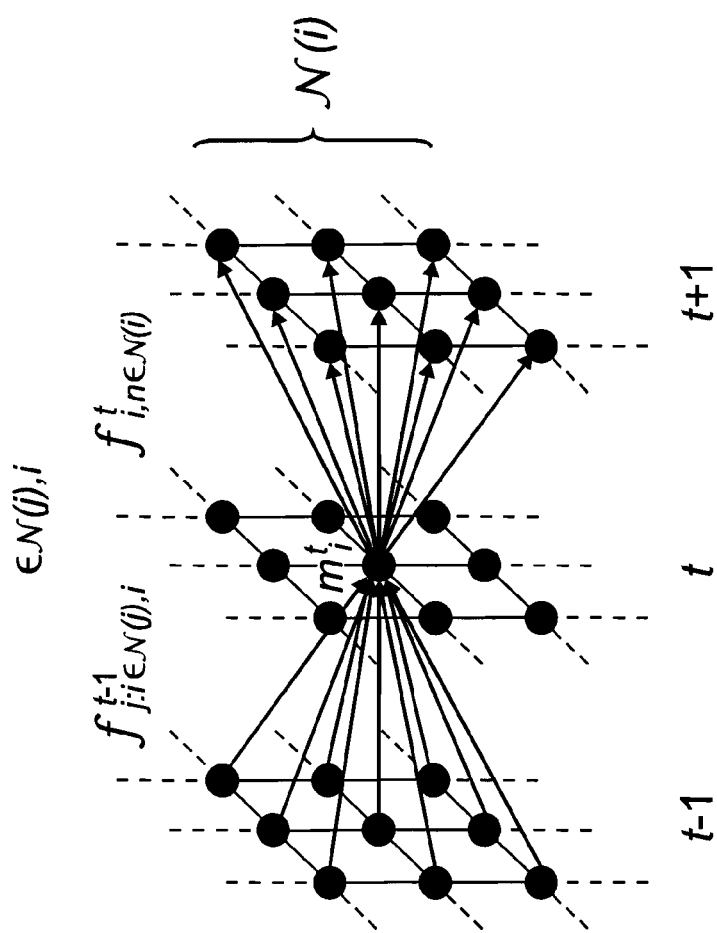
FIG. 2B shows some discrete points of a tracking model and the allowed movements to and away from one discrete point, wherein the discrete points are shown in a matrix arrangement.

FIGS. 2A and 2B show each an example of the tracking model as described until now. FIGS. 2A and 2B show each a subset of the set of discrete points of the tracking model. In FIG. 2A the locations i−1,i,i+1 at time instances t−1,t,t+1 are shown. The admissible flows $f_{j,i}^{t-1}$, $\forall j:i\in N(j)$; from all locations j at t−1 to one discrete point at location i at time step t of the tracking model is shown. Also the admissible flow $f_{i,j}^t$, $\forall j\in N(i)$ from said discrete point at location i at time step t of the tracking model is shown. The set of discrete points $j\in N(i)$ corresponds to the neighbourhood set of said vertex corresponding to the discrete point corresponding to i and t. In FIG. 2A, the admissible flows are only shown for said vertex corresponding to i and t. However, it is obvious that the same holds for the other vertices. Normally the neighbourhood set of each vertex is chosen analogue, that is, in case of FIG. 2A by $N(i)\in\{i-1,i,i+1\}$. Some neighbourhood sets certainly are different, if e.g. the discrete point is arranged at the border of the tracking area, e.g. $N(1)\in\{1,2\}$. While in FIG. 2A the locations are arranged in one dimension and are more adapted to represent a tracking line, the vertices in FIG. 2B are arranged in a two-dimensional map which is more adapted to represent any two-dimensional tracking surface. Since normally tracking objects are detected on the ground, a third dimension is normally not necessary. However, the invention is also adapted to have a number of locations in three dimensions at every time step. However, the arrangement of the vertex in a vector, map or a three-dimensional matrix is independent from the tracking problem, i.e. one, two or three-dimensional tracking problem. That is, that vertices of a two-dimensional tracking problem could mathematically also be rearranged in a vector.

In general, the number of tracked objects may vary over time, meaning that objects may appear inside the tracking area and others may leave. Thus, the total mass of the system changes and flows must be allowed to enter and exit the tracking area. This is done by introducing two additional vertices $v_{source}$ and $v_{sink}$ into our graph, which are linked to all the vertices representing positions in the tracking area through which objects can respectively enter or exit the tracking area, such as doors or borders of the camera field of view. In addition, a flow goes from $v_{source}$ to all the vertices of the first frame $I^1$, i.e. of the first time step, and reciprocally a flow goes from all the vertices of the last frame $I^T$, i.e. from the last time step, to $v_{sink}$. $v_{source}$ and $v_{sink}$ are called virtual locations, because, as opposed to the other vertices of the graph, they do not represent any physical location.

Figure 3:
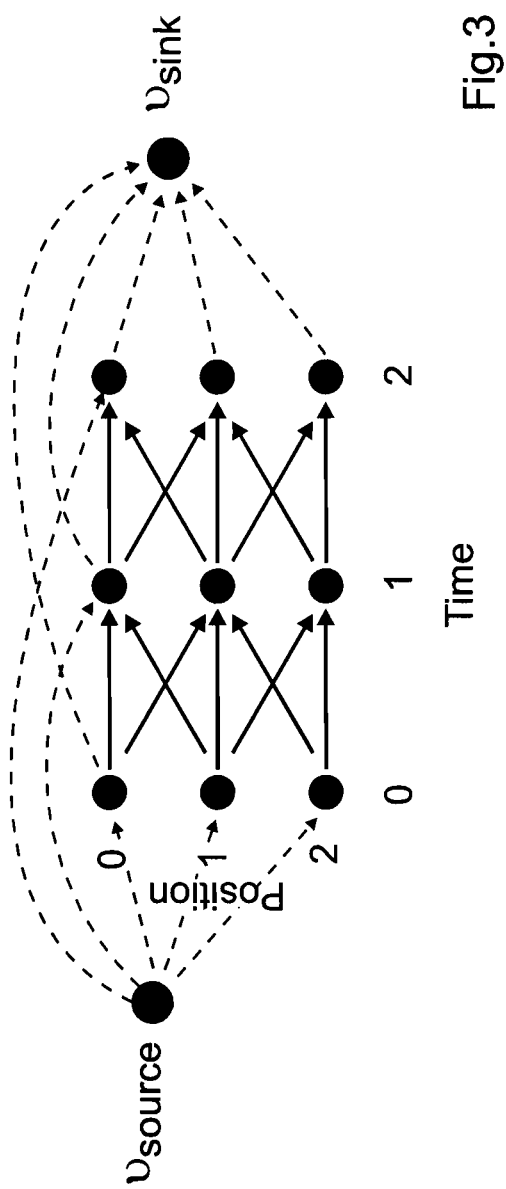
FIG. 3 shows a complete tracking model.

An exemplary resulting complete graph of the tracking model according to the invention is shown in FIG. 3 with K=3 and T=3.

The subset of vertices representing positions through which objects can respectively enter the tracking area is called source subset. As mentioned above, in a best mode to carry out the invention, the source subset comprises all K locations of the first time step and the locations at each time step representing positions in the tracking area where objects can enter like doors or the borders of the tracking area. Normally, the subset of the K locations comprised in the source subset which represent entering points of the tracking model is the same for time steps t=2, . . . , T. However, the invention is not restricted to such a source set. The source subset could also comprise only all K locations of the first time step, if the objects are not allowed to enter during the tracking period. The source subset could also comprise only the locations representing positions in the tracking area where objects can enter like doors or the borders of the tracking area, if the objects enter the tracking area only within the tracking period. The source subset could also be any strict subset of the set of discrete points for example with locations for entering the tracking area which change over the time. The source subset will also be called neighbourhood set $N(v_{source})$ of the virtual source location $v_{source}$. The set of discrete points representing positions through which objects can exit the tracking area is called sink subset. The sink subset is defined equivalently to the source subset. Normally, the sink subset is defined equal to the source subset, wherein instead of the first frame, the K locations of the last frame are included. However, the invention is not restricted to an equivalent sink subset. The neighbourhood set of the discrete points being part of the sink subset respectively comprises also the virtual sink location $v_{sink}$.

Finally, an additional constraint that ensures that all flows departing from $v_{source}$ eventually end up in $v_{sink}$ $$\sum_{j\in N(v_{source})} f_{v_{source},j} = \sum_{n:v_{sink}\in N(n)} f_{n,v_{sink}} \qquad (4)$$

is introduced.

Now the second step S2 will be described. Let $M_i^t$ denote a random variable standing for the true presence of an object at location i at time t. For every location i and every instant t, an estimate of the probability $\rho_i^t$ of the presence of an object is determined in S2 as occupancy probability distribution. This estimate might be the marginal posterior probability $$\rho_i^t = \hat{P}(M_i^t=1|I^t). \qquad (5)$$

The different ways of determining the occupancy probability distribution is known. In the following an exemplary determination of the occupancy probability distribution is described. For each time step the probability of finding one object at each location of this time step is determined on the basis of all images of said time step. The probability of finding one object at each location and each time step form the occupancy probability distribution of the set of discrete points of the tracking model. In order to determine the probability for each time step, first binary background/foreground segmentation is performed in all images taken at the same time. Then a generative model is used to estimate the most likely locations of targets given the observed foreground regions. More precisely in the exemplary step S2, it relies on a decomposition of the space of possible object positions into a discrete grid which correspond to the set of locations i at time t. Then, at every time frame t, and for every location i of the grid, it produces an estimate $\rho_i^t$ of the marginal posterior probability of presence of a target object at that location, given all input images captured at that time step t. In the exemplary step S2, the $\rho_i^t$ is estimated such that the resulting product law closely approximates the joint posterior distribution, which justifies the later assumption of conditional independence in Equation (7). The grid of positions models the ground plane on which objects move. Each position correspond to a square whose size is typically 30 cm×30 cm. Correspondence between camera and top views is ensured through camera calibration. If the camera position has a top view, a calibration would not be necessary. The generative model represents e.g. people as cylinders that project to rectangles in the images. However, other objects could be represented by different forms. For example, balls could be represented by rectangles. Note that, in the tracking model according to the invention, the resolution of the ground grid is independent of the target's size. If grid cells are smaller than a target, the spatial precision of detections is improved at the cost of increased computation time, but the detections do not spread over several cells. In effect in the exemplary step S2 for determining the occupancy probability distribution, a non-maximum suppression is implicitly performed: The best fitted position receives a high probability while surrounding locations are considered as empty. As a result, the occupancy probability distributions of the exemplary step S2 are normally peaky, which is what the linking method according to the invention prefers.

In the following, the third step S3 will be described in detail. Let $\vec{m}$ be a set of all KT variables $m_i^t$, one for each location and for each time step. One set of variables is sometimes also called occupancy map. $\vec{m}$ is feasible, if there exists a set of flows $f_{i,j}^t$ that satisfies Equations (1), (2), (3) and (4), i.e. that satisfies the tracking model according to the invention. F is defined as the set of feasible solutions of the tracking model $\vec{m} \in F$. In order to find the most likely trajectories of all tracking objects of interest given all physical data measured, the following equation $$\vec{m}^* = \underset{\vec{m} \in H}{\operatorname{argmax}} \hat{P}(\vec{M} = \vec{m}|I) \qquad (6)$$

is solved. Wherein $\vec{M}$ is the vector of random variables $M_i^t$ and I denotes all physical data of all time steps.

Assuming conditional independence of the $M_i^t$, given the $I^t$, the optimization problem of equation (6) can be re-written under the assumption of conditional independence of the $M_i^t$ given $I^t$ as $$\vec{m}^* = \underset{\vec{m} \in F}{\operatorname{argmax}} \log \prod_{t,i} \hat{P}(M_i^t = m_i^t|I^t) = \underset{\vec{m} \in F}{\operatorname{argmax}} \sum_{i,t} \log \hat{P}(M_i^t = m_i^t|I^t). \qquad (7)$$

Equation (7) can be rewritten as $$\vec{m}^* = \underset{\vec{m} \in F}{\operatorname{argmax}} \sum_{i,t} [(1-m_i^t)\log \hat{P}(M_i^t = 0|I^t) + m_i^t \log \hat{P}(M_i^t = 1|I^t)]. \qquad (8)$$

because $m_i^t$ is 0 or 1 according to equation (2). Equation (8) can be rewritten as $$\vec{m}^* = \underset{\vec{m} \in F}{\operatorname{argmax}} \sum m_i^t \log \frac{\hat{P}(M_i^t = 1|I^t)}{\hat{P}(M_i^t = 0|I^t)} \qquad (9)$$

by ignoring a term which does not depend on $\vec{m}$. Hence, by combining equations (9) and (5), the objective function of $$\vec{m}^* = \underset{\vec{m} \in F}{\operatorname{argmax}} \sum \left(\log \frac{\rho_i^t}{1-\rho_i^t}\right) m_i^t \qquad (10)$$

is a linear expression of the $m_i^t$. By solving Equation (10) a method of a first embodiment of the invention has been found.

In step S3, a generic estimation method for multiple object tracking is found which only requires an occupancy probability distribution from a detector as input. Very few parameters need to be set and the method handles unknown, and potentially changing, numbers of objects while naturally filtering out false positives and bridging gaps due to false negatives.

A second embodiment of a method for tracking multiple objects according to the invention corresponds mainly to the first embodiment of the invention. In step S3, equation (10) is replaced by $$\vec{f}^* = \underset{\vec{f} \in H}{\operatorname{argmax}} \sum \left(\log \frac{\rho_i^t}{1-\rho_i^t}\right) \sum_{j \in N(i)} f_{i,j}^t. \qquad (11)$$

In this system, the optimization is carried out with respect to the flows $f_{i,j}^t$ rather than the occupancies $m_i^t$, because it is difficult to express the flow continuity, constraints (1), (2), (3) and (4) in terms of the latter. This is equivalent to maximizing the objective function of Eq. (10) because $$\forall j, t, m_j^t = \sum_{n \in N(j)} f_{j,n}^t.$$

In the second embodiment, the constraints of (1), (2), (3) and (4) are expressed as inequalities $$\forall t, i, j, f_{i,j}^t \geq 0 \qquad (12)$$

$$\forall t, i, \sum_{j \in N(i)} f_{i,j}^t \leq 1$$

$$\forall t, i, \sum_{j \in N(i)} f_{i,j}^t - \sum_{n: i \in N(n)} f_{n,i}^{t-1} \leq 0$$

$$\sum_{j \in N(v_{source})} f_{v_{source},j} - \sum_{n: v_{sink} \in N(n)} f_{n,v_{sink}} \leq 0,$$

to have the linear program in canonical form. This new formulation is strictly equivalent to the original one and no additional constraint is needed. The inequalities are indeed sufficient to ensure that no flow can ever appear or disappear within the graph. Under this formulation, an Integer Program is achieved which can be solved by any generic Linear Programming solver. Due to the linearity of the formulation, the most likely trajectories of the objects of interest are found with certainty.

A third embodiment of a method for tracking multiple objects according to the invention corresponds mainly to the second embodiment. In the third embodiment, the integer assumption is relaxed and a continuous Linear Program is solved instead. Linear program solvers are methods which solve a maximization or minimization problem of a function by varying an argument. Continuous linear program solvers compared to integer program solvers, allow real numbers as solutions, while integer program solvers allow only integers as solutions. In general, continuous linear program solvers rely on variants of the simplex algorithm or interior point based methods. The second embodiment has the disadvantage that Integer Program solving is NP-complete and thus very time and memory consuming. The third embodiment has the advantage of a polynomial-time average-case complexity. Due to the very large size of our problem, the optimization problem of the second embodiment would not be efficient. The drawback of the continuous Linear Program would normally be that the continuous linear program is unlikely to converge to the optimal solution of the original Integer Program and is therefore normally not chosen. In the present tracking model according to the invention, it can be shown that the relaxed continuous Linear Program always converges towards an integer solution because its constraint matrix exhibits a property known as total unimodularity.

However, this approach would still only be tractable for moderately sized problems, and does not scale to most practical applications. Therefore, in the following a fourth embodiment of the invention is presented which is the best mode to carry out the present invention. The best mode is obtained by a more efficient optimization scheme which takes into account the specificity of our problem and tremendously reduces the complexity.

In the fourth embodiment, the problem is reformulated as a k shortest node-disjoint paths problem on a directed acyclic graph (DAG). Thereby, the complexity can be drastically reduced. Given a pair of nodes, namely the virtual source location $v_{source}$ and virtual sink location $v_{sin\ k}$, in a graph G, the k shortest paths problem is to find the k paths $\{p_1, \ldots, p_k\}$ between these nodes, such that the total cost of the paths is minimum. The problem is well-studied in the network optimization literature and the results have been widely applied in the field of network connection routing and restoration. There exists many variants of the algorithm, each targeted at a specific problem instance. In the specific case, the graph is directed and paths are both node-disjoint—i.e. two separate paths cannot share the same node—and node-simple—i.e. a path visits every node in the graph at most once. The graph structure with a single virtual source location and a single virtual sink location illustrated by FIG. 3.

Any path between $v_{source}$ and $v_{sin\ k}$ in this graph represents the flow of a single object in the original problem along the edges of the graph. The node-disjointness constraint means that no location can be shared between two paths, hence two objects. This is thus equivalent to the constraint of Equation (2). Moreover, by only looking for paths between the virtual source location and virtual sink location, i.e. their correspondent vertices, it is ensured that no flow can ever be created nor suppressed anywhere in the graph but at the virtual locations. This enforces the constraints of Equations 1 and 4. Finally, the node-simple characteristic of the paths simply stems from the fact that our graph is a DAG, hence acyclic. A directed edge $e_{i,j}^t$ from location i at time t to location j at time t+1 is assigned the cost value $$c(e_{i,j}^t) = -\log\frac{\rho_i^t}{1-\rho_i^t} \qquad (13)$$

The cost value of the edges emanating from the node of the virtual source location is set to zero to allow objects to appear at any entrance position and at any time instant at no cost. We formulate our problem as a minimization problem by negating the objective function of Equation (11). Let H denote the set of feasible solutions of the original LP formulation of Equation (11), satisfying the constraints given in Equation (12). Then, the optimal solution $\vec{f}^*$ of the k-shortest paths problem can be written as $$\vec{f}^* = \operatorname*{argmin}_{\vec{f} \in H} \sum_{t,i} c(e_{i,j}^t) \sum_{j \in N(i)} f_{i,j}^t \qquad (14)$$

where $c(e_{i,j}^t)$ represents the cost of the edge $e_{i,j}^t$ defined in Equation (13). Note that any k node-disjoint paths between $v_{source}$ and $v_{sin\ k}$ with arbitrary k is in the feasible set of solutions H. In addition, any solution in H can be expressed as a set of k node-disjoint paths. Let $p_i^*$ be the shortest path computed at the i-th iteration of the algorithm and $P_l = \{p_1^*, \ldots, p_l^*\}$ be the set of all l shortest paths computed up to iteration l. We start by finding the single shortest path in the graph $p_1^*$ and compute its total cost $$\operatorname{cost}(p_l^*) = \sum_{e_{i,j}^t \in p_l^*} c(e_{i,j}^t) \qquad (15)$$

Then the l-shortest paths are iteratively computed for l=2, 3, . . . . For each l, the total cost of the shortest paths $$\operatorname{cost}(P_l) = \sum_{i=1}^{l} \operatorname{cost}(p_i^*) \qquad (16)$$

are calculated. At each new iteration l+1, the total cost cost$(P_{l+1})$ is compared to the cost at the previous iteration cost $(P_{l+1})$. The optimal number of paths k* is obtained when the cost of iteration k*+1 is higher than the one of iteration k*.

To compute such k-shortest paths, the disjoint paths algorithm published in "disjoint Paths in a Network", by J. W. Suurballe in Networks, vol. 4, pp. 125-145, 1974, which is an efficient iterative method based on signed paths.

The equivalence of the Linear Programming approach of the first to third embodiment and the k-shortest paths formulations follows from the exact procedure used to select an optimal k such that the objective function is minimized. Since path costs are monotonically increasing $$\operatorname{cost}(p_{i+1}^*) \geq \operatorname{cost}(p_i^*), \forall i, \qquad (17)$$

the total cost function cost$(P_l)$ is convex with respect to l. Therefore, the global minimum is reached when cost$(p_i^*)$ changes sign and becomes non-negative $$\operatorname{cost}(P_{k^*-1}) \geq \operatorname{cost}(P_{k^*}) \leq \operatorname{cost}(P_{k^*+1}).$$

This is set as the stopping criterion of the algorithm. Finally, among the set of all consecutive values that may satisfy the above condition, the smallest one is selected to avoid erroneous splitting of paths. The worst case complexity of the algorithm is O(k(m+n log n)), where k is the number of objects appearing in a given time interval, m is the number of edges and n the number of nodes in the final transformed graph. Furthermore, due to the mostly acyclic nature of our graph, the average complexity is almost linear with the number of vertices. This is much faster than general LP solvers, and a speed gain of up to a factor 1,000 can be expected, as illustrated by a run time comparison.

It is obvious that the maximization problem in the first, second and third embodiment in Equations (10) and (11) correspond to any linear transformation thereof. If the maximization equations are multiplied by a negative factor, the maximization problem becomes a minimization problem. Therefore, according to the invention an extremum of a function being based on the functions of Equations (10) and (11) has to be found by optimizing the corresponding arguments. Extremum is a maximum or minimum of said function. In particular, the extrumum is a global maximum or a global minimum. In the same way it is also obvious that in the fourth embodiment, instead of the k-shortest path disjoint paths the k-longest path disjoint paths could be determined if the cost functions are multiplied by a negative factor.

The tracking model of the first to the fourth embodiment comprises a grid of discrete points. At each time point t, the same K locations are arranged in the tracking model. However, the invention is not restricted to such a set of discrete points. For example the number of discrete points K(t) of each time step could be dependent on the time. It is also possible that the locations at each time step are not at the same physical point. The invention applies to any arrangement of the set of discrete points over the spatio-temporal space. Especially, the fourth embodiment could be carried out efficiently for any arrangement of the discrete points, since graphs are adapted to handle such asymmetric problems.

Processing a whole video sequence is possible but impractical for applications such as broadcasting, in which the result must be supplied quickly. Therefore, in step S1, when dealing with such cases, the sequence is split in batches of 100 frames, which yields good results and can be done in real-time. This results in a constant 4-second delay between input and output, which is nevertheless compatible with many applications. To enforce temporal consistency across batches, we add the last frame of the previously optimized batch to the current one. We then force the flows out of every location of this frame to sum up to the location's value in the previous batch $$\forall n \in \{1, \ldots, K\}, \sum_{j \in N(n)} f_{n,j}^{-1} = a_n \qquad (19)$$

where $a_n$ is the score at location n of the last frame of the previous batch and $f_{n,j}^{-1}$ is a flow from location n of the last frame of the previous batch to location j in the first frame of the current batch. This is implemented as an additional constraint in tracking model according to the invention.

Further reducing the system's size might be needed for extremely large problems, to limit their time and memory consumption. It could be achieved by pruning the detection graph. Since most of the probabilities of presence estimated by the detector are virtually equal to zero, we can use this sparsity to reduce the number of nodes to consider in the optimization, thus reducing the computational cost. Formally, for every position n and every frame t, the maximum detection probability is checked within a given spatio-temporal neighbourhood $$\max_{\substack{\|j-k\|<\tau 1 \\ t-\tau 2<u<t+\tau 2}} \rho_j^u$$

If this value is below a predetermined threshold, the location is considered not reachable by an object with any reasonable level of probability. All flows to and from it are then removed from the model. Applying this method would reduce the number of variables and constraints up to an order of magnitude.

The second and third embodiments described yield $f_{i,j}^t$ instead of $m_i^t$. However, estimating $f_{i,j}^t$ the indirectly provides the $m_i^t$ values and the feasible occupancy map $\vec{m}^*$ of maximum posterior probability. However, the $f_{i,j}^t$ themselves provide, in addition to the instantaneous occupancy, estimates of the actual motions of objects. From these estimated flows of objects, one can follow the motion back in time by moving along the edges whose $f_{i,j}^t$ are not 0, and build the corresponding long trajectories.

Figure 4:
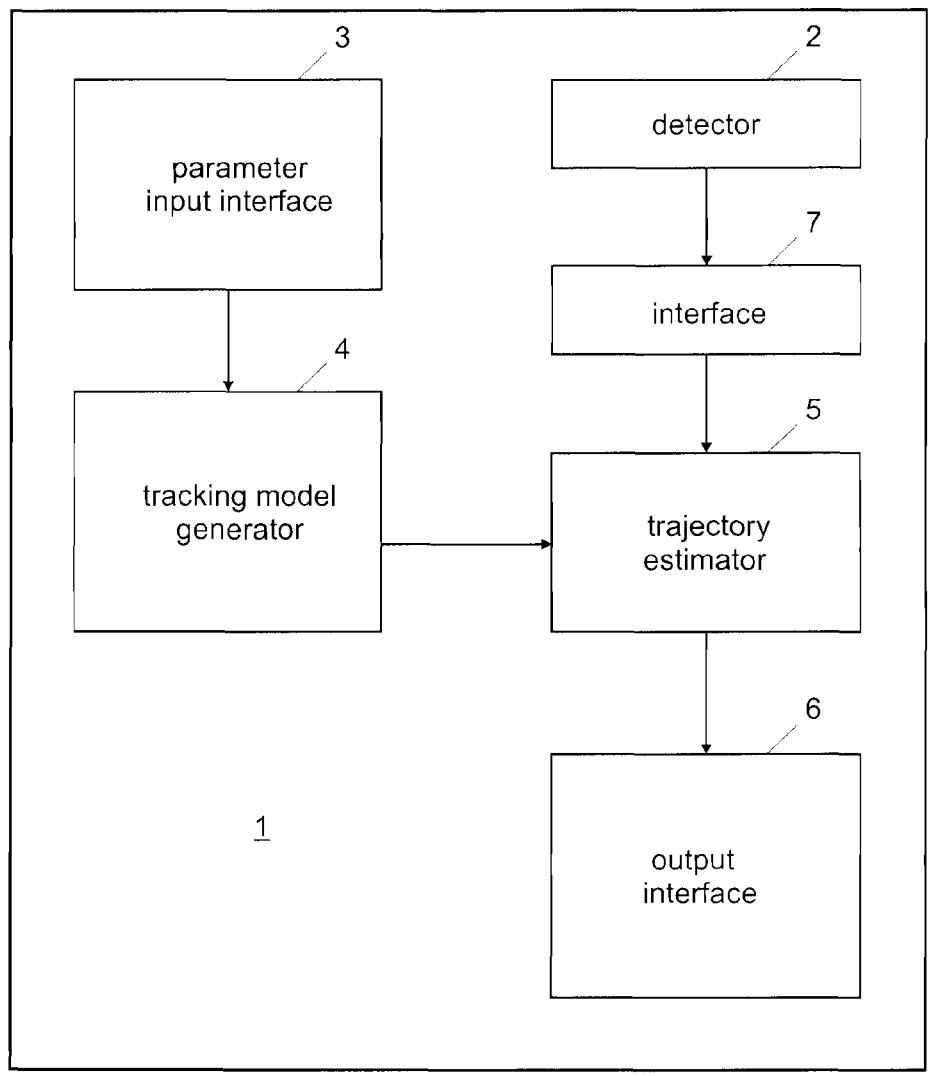
FIG. 4 shows an embodiment of the tracking apparatus according to the invention.

FIG. 4 shows a tracking apparatus 1 according to one embodiment of the invention. A detector 2 measures physical data of a tracking area. The detector 2 generates an occupancy probability distribution of presence of objects in the tracking area. The occupancy probability distribution is given via an interface 7 to an trajectory estimator 5. An parameter input interface 3 allows a user or another apparatus to enter parameter of the tracking model. This could be the number and the arrangement of the discrete points, e.g. the number of locations K and the number of time steps T. The number of time steps may even be derived from the number of time steps measurements in the detector 2 were performed. Further parameters would be the neighbourhood set, the source subset and the sink subset. However, the neighbourhood set, the source subset and the sink subset and the number and arrangement of the discrete points may already be predetermined for the case the user does not enter any parameters. The parameters are given to the tracking model generator 4. The tracking model generator generates the tracking model according to the parameters of the input parameter interface 3. Then the trajectory estimator 5 estimates the trajectories of objects by determining the optimal solution(s) of the tracking model generated in the tracking model generator 4 on the basis of an occupancy probability distribution from the detector 2. The trajectory estimator 5 uses the method according to the invention as described above for determining the trajectories. The occupancy map with the maximum likelihood given the physical measurements is given to an output interface 6. The output interface 6 gives the occupancy map of the trajectory estimator 5 to the user or a further apparatus.

In order to show the superiority of the invention over the state of the art, a number of tracking applications will be shown. These tracking applications are in two very different contexts. In the first context, a multi-camera setup is used in which the cameras are located at fix locations at shoulder level to track pedestrians who may walk in front of each other. The frequent occlusions between people produce noisy detections, which the invention nevertheless links very reliably. As a result, the invention was shown to compare favorably against other state-of-the-art methods. Second, to highlight the fact that the present invention do not depend on an appearance model, sets of similar-looking bouncing balls seen from above are tracked. In both cases, results of the tracking method according to the invention are compared to those of an earlier tracking method based on sequential Dynamic Programming as referred to in the introduction. It is further shown that good results can be obtained with the present invention even when using a single camera.

In a first application, here-after also called laboratory sequence, a 3½-minute outdoor sequence consists of up to 9 people appearing one after the other, and walking in front of the cameras. With the laboratory sequence, the ability of the method according to the invention to cope with a moderately crowded environment can be tested. The scene was filmed by 4 Digital Video cameras (DV cameras) with overlapping fields of view, each of which placed in a corner of the monitored area. The video format is DV PAL, down-sampled to 360×288 pixels at 25 fps and the 4 video streams were synchronized manually after data acquisition. The dimension of the tracking area is 7 m×10 m, which is discretized in the tracking model by a grid of 30×45 locations for each time step.

In a second application, here-after also called basketball sequence, 10 basketball players in a game on half a basketball court are tracked. It is a difficult sequence with fast moving people and many occlusions. The scene was filmed by 4 Digital Video cameras (DV cameras) with overlapping fields of view, each of which placed in a corner of the monitored area. The video format is DV PAL, down-sampled to 360×288 pixels at 25 fps and the 4 video streams were synchronized manually after data acquisition. The dimension of the tracking area is 15 m×14 m, which is discretized in the tracking model by a grid of 47×50 locations for each time step.

In a third application, here-after also called passageway sequences, several people passing through a public underground passageway are tracking. Such passageway sequences are very challenging for several reasons. First, lighting conditions are very poor, which is typical in real-world surveillance situations. A large portion of the images is either under-exposed or saturated. Second, the area covered by the system is large, and people get very small on the far end of the scene, making their precise localization challenging. Finally, large parts of the scene are filmed by only two or even a single camera. All these difficulties greatly affect the quality of the occupancy probability distribution, used as input. On these noisy sequences, if people had to be detected by simply thresholding the maps in individual frames, the true positive rate would drop to 70\% to 80\%, thus making the linking task challenging. The video format is also DV PAL, down-sampled to 360×288 pixels at 25 fps and the 4 video streams were synchronized manually after data acquisition. The dimension of the tracking area is 12 m×30 m, which is discretized in the tracking model by a grid of 40×100 locations for each time step.

In a fourth application, about 10 people are filmed at a road corner of a university campus. Important light changes between the background model and the sequence, as well as precision issues in camera calibration make the people detection results noisy. Moreover, the sequence was acquired at a low frame rate of 7 fps, which creates an additional difficulty, since people can move significantly from one frame to the next. The sequence was filmed by seven cameras: three dedicated video surveillance cameras and four DV cameras. The DV cameras were placed at about 2 meters above the ground, whereas the video surveillance cameras were located between 3 to 5 meters above it, and significantly farther from the scene. The frame rate for all cameras was set to 7 fps. Due to calibration imprecision, only five out of the seven available camera views were used for people detection. The dimension of the tracking area is 18.5 m×20 m, which is discretized in the tracking model by a grid of 56×61 locations for each time step.

In a fifth application, equal tennis balls are tracked. In the fifth application, two video sequences in which 24 table tennis balls were thrown on the ground are filmed and used for tracking. The two video sequences were each filmed by a single DV camera, placed about 1.5 m above the ground. The videos were cropped to a resolution of 600×400 pixels, and the corresponding area was discretized into a grid of 60×40 locations for each time step.

In the following, the results of the greedy dynamic programming approach (DP) of the state of the art applied to the described applications are compared with the results of the fourth embodiment of the method according to the invention applied to the described applications. The method of the state of the art uses in addition to the occupancy probability distribution an appearance model. That is, it uses the color of the objects in the camera frames and needs therefor an additional input of the camera frames.

For pedestrians tracking, i.e. in the first to fourth application, the tracking model is defined as follows: Every interior location of the tracking area at time t is linked to its 9 direct neighbours at time t+1, as illustrated by FIG. 2A, which means that a pedestrian can only move from one location to its immediate neighbours in a consecutive time step. Border locations through which access to the tracking area is possible are connected to the virtual source location and the virtual sink location. This arrangement is consistent with our chosen grid quantization at 25 fps in the first to third application. It even suits the 7 fps sequence of the fourth application, since the pedestrians do not move fast. In order to deal with an even lower frame rate, or faster moving objects, the neighbourhood size could be extended. For estimating the trajectories, step S3 according to the fourth embodiment of the invention is used, that is, estimating the trajectories of the k pedestrians by finding the k-shortest path disjoint paths. In both detection and tracking precision, the method according to the invention almost always scores significantly higher than the method according to the state of the art.

Detection accuracy varies across sequences, depending on their difficulty. The passageway sequences, for instance, have lower accuracy than other sequences, due to their poor image quality. Despite these variations, the detection accuracy of the method according to the invention is always higher than the occupancy probability distribution itself. By accurately linking detections together, while discarding isolated alarms, the method according to the present invention efficiently filters the detections results, thus decreasing both false positive and missed detection counts. On the other hand, DP's accuracy is often lower than the occupancy probability distribution itself, because of its tendency to ignore trajectories with missing detections. The gap between the method according to the present invention and DP generally widens as the occupancy probability distribution score gets lower. Both tracking methods deal efficiently with good detection results, but the method according to the present invention proves much more robust than DP when the detection quality gets worse. A further advantage of the method according to the invention over DP is that it bases only on the input of the occupancy probability distribution. The method of the present invention does not use any other source of information, such as the original images. Conversely, DP maintains a color model per tracked individual learned from images, in addition to the occupancy probability distribution. In other words, the method according to the present invention produces better results, even though it requires less information.

The strength of the method according to the invention is further shown by slightly amending the fourth application. The occupancy probability distribution is determined in step S2 using only one of the 7 available views. Although the exemplary step S2 for determining the occupancy probability distribution still works on monocular sequences, ground plane localization is less precise: Without views from different angles, there is a depth ambiguity when estimating a pedestrian's position. Also, in the monocular case, occlusions often result in missed detection. Under these challenging conditions, the method according to the invention shows its superiority over the sequential Dynamic Programming, even more clearly than in the multi-camera case. In this context, DP's greedy strategy often leaves tracking people outside the grid instead of trying to explain their very noisy detections. By contrast, joint optimization of the present invention pays off and interpolates trajectories nicely.

In the fifth application of the method according to the invention, it has to be considered that given the difference in grid scale, the balls move much faster than pedestrians, and can cross more than one grid location between consecutive frames. To deal with this environment, the location neighbourhood set is extended to include the next closest 49 locations, which increases the maximum distance traveled between consecutive frames to 3 grid locations.

Detecting ping-pong balls is not a particularly difficult task. Thus, results of the occupancy probability distribution are generally excellent, with very few false positives and false negatives. As already mentioned above, DP considers in addition to the occupancy probability distribution also the color of the objects in the original images. However, because all balls have exactly the same appearance, DP's color model is useless and the comparison between the two algorithms is fair. As for the pedestrian environment, the method of the present invention outperforms DP. Here again, DP's greedy strategy is a disadvantage. Because it might be less costly to ignore some isolated detections, DP tends to leave out too many of them.

Another problem to which method according to the invention is potentially vulnerable is identity switch. Since we rely entirely on detection data and do not use any appearance information nor complex motion model, there is no way to distinguish two trajectories intersecting. In practice, we do not suffer much from this, because most of the time, the objects evolve outside of each other's neighbourhood. Moreover, the joint optimization of all trajectories pays off in this regard, as opposed to DP's greedy strategy.

Finally, the speed of the method according to the invention is evaluated. The method according to the third embodiment of the invention is 100 to 1000 times slower than the fourth embodiment of the invention. The method according to the invention according to the fourth embodiment is about 10 times faster than the greedy dynamic programming approach of the state of the art. In the method according to the invention according to the fourth embodiment, when dealing with 25 fps videos, a batch of frames can in average be processed in less than half the time it takes to play it. This means that for a frame rate of 25 fps or less, our tracker can readily operate in real time.

The invention claimed is:

1. Method for tracking objects comprising the steps of:
estimating by a trajectory estimator, trajectories of objects by determining optimal solutions of a tracking model on the basis of an occupancy probability distribution, wherein the occupancy probability distribution is the probability of presence of objects over a set of discrete points in the spatio-temporal space at a number of time steps;

wherein the tracking model comprises said set of discrete points, a virtual source location and a virtual sink location, wherein objects in the tracking model are creatable in the virtual source location and are removable in the virtual sink location;

wherein the tracking model fulfils the following constraints;

a created object is only allowed to move from the virtual source location to a source subset of the set of discrete points;

an object is only allowed to move from each discrete point to a predetermined neighbourhood set of said discrete point, wherein the neighbourhood set comprises a subset of the union of the set of discrete points and the virtual sink location;

an object is only allowed to move from a sink subset of the set of discrete points to the virtual sink location;

the number of objects moving to each discrete point is equal to the number of objects moving away from this discrete point;

the number of objects moving away from or moving to one discrete point is smaller than or equal to one;

the number of objects moving from each discrete point to another discrete point is zero or positive; and any object created in the virtual source location eventually has to end up in the virtual sink location.

2. Method according to claim 1, wherein a k-shortest path algorithm or a k-longest path algorithm is used for estimating the optimal solutions of the tracking model.

3. Method according to claim 2, wherein the trajectory estimator is determined by formulating the tracking model as a directed acyclic graph with the discrete points, the virtual sink location and the virtual source location as vertices and the allowed movements of the objects as directed edges which are weighted by cost functions and by finding the k shortest or k longest node-disjoint paths in this graph between the virtual source location and the virtual sink location, wherein k represents the number of objects being tracked in the model.

4. Method according to claim 3, the length of a k node-disjoint path between the virtual source location and the virtual sink location is the sum of the weights of the edges along these paths.

5. Method according to claim 3, wherein the cost functions of a subset of the edges depend on the occupancy probability distribution.

6. Method according to claim 5, wherein the edge between the discrete point i and the discrete point j∈N(i) where N(i) is the neighbourhood set of the discrete point i and, if there is an edge between the discrete point i and the virtual sink location v sin k, the edge between the discrete point i and the virtual sink location v sin k is weighted by the cost function being based on the term $$\log\left(\frac{\rho_i}{1-\rho_i}\right)$$

where $\rho_i$ is the probability of presence of an object at the discrete point i=1, . . . , L resulting from the occupancy probability distribution.

7. Method according to claim 6, wherein the cost function is directly proportional to $$\log\left(\frac{\rho_i}{1-\rho_i}\right)$$

and the trajectory estimator is determined by finding the k shortest node-disjoint paths between the virtual source location and the virtual sink location.

8. Method according to claim 7, wherein an estimator k* for the number of objects being tracked in the tracking model is determined on the basis of iteratively finding the k shortest node-disjoint paths starting from k=1 and stopping at k=l, when the length of the l shortest node-disjoint paths is greater than the length of the l−1 shortest node-disjoint paths, wherein estimator k* corresponds to l−1.

9. Method according to claim 6, wherein the cost function is directly proportional to $$-\log\left(\frac{\rho_i}{1-\rho_i}\right)$$

and the trajectory estimator is determined by finding the k longest node-disjoint paths between the virtual source location and the virtual sink location.

10. Method according to claim 9, wherein an estimator k* for the number of objects being tracked in the tracking model is determined on the basis of iteratively finding the k longest node-disjoint paths starting from k=1 and stopping at k=l, when the length of the l longest node-disjoint path becomes smaller than the length of the l−1 longest node-disjoint paths, wherein the estimator k* corresponds to l−1.

11. Method according to claim 3, wherein the edges from the virtual source location to the source subset are weighted by a cost function equal to zero.

12. Method according to claim 1, wherein the trajectory estimator for the solutions of the tracking model is based on the functions $$\left(\log\frac{\rho_i}{1-\rho_i}\right)$$

for the discrete points i=1, . . . , L, wherein L is the number of discrete points of the set of discrete points and $\rho_i$ is the probability of presence of an object at the discrete point i=1, . . . , L resulting from the occupancy probability distribution.

13. Method according to claim 12, wherein the trajectory estimator is determined by finding an $\vec{f}^* \in H$, which yields a maximum of a function being based on $$\sum_i \left[\left(\log\frac{\rho_i}{1-\rho_i}\right) \cdot \sum_{j\in N(i)} f_{i,j}\right]$$

or a minimum of a function being based on $$\sum_i \left[-\left(\log\frac{\rho_i}{1-\rho_i}\right) \cdot \sum_{j\in N(i)} f_{i,j}\right],$$

wherein H is the set of feasible solutions $\vec{f}$ of the tracking model, $\vec{f}$ is a vector of variables $f_{i,j}$ with i=1, . . . , L and j∈N(i), $f_{i,j}$ is the number of objects moving from discrete point i to discrete point j and N(i) is the neighbourhood set of the discrete point i.

14. Method according to claim 13, wherein the constraints of the tracking model are considered by the following formulas $$\forall\, i, j,\; f_{i,j} \geq 0$$
$$\forall\, i,\; \sum_{j\in N(i)} f_{i,j} \leq 1$$
$$\forall\, i,\; \sum_{j\in N(i)} f_{i,j} - \sum_{n: i\in N(n)} f_{n,i} \leq 0$$
$$\sum_{j\in N(v_{source})} f_{v_{source},j} - \sum_{n: v_{sink}\in N(n)} f_{n,v_{sink}} \leq 0,$$

wherein $N(v_{source})$ is the source subset, $\{n | v_{sin\,k} \in N(n)\}$ is the sink subset, $fv_{source}^{\,j}$ is the number of objects moving from the virtual source location v source to the discrete point j of the source subset and $f_{n,v\,sin\,k}$ is the number of objects moving from the discrete point n to the virtual sink location v sin k.

15. Method according to claim 14, wherein a continuous linear program solver is used for finding $\vec{f}^*$.

16. Method according to claim 13, wherein a k-shortest path algorithm or a k-longest path algorithm is used for finding $\vec{f}^*$.

17. Method according to claim 1, wherein the source subset comprises all the discrete points corresponding to the first time step.

18. Method according to claim 1, wherein the sink subset comprises all the discrete points corresponding to the last time step.

19. Method according to claim 1, wherein the source subset and the sink subset comprise a predetermined subset of the set of discrete points.

20. Method according to claim 1, wherein the predetermined neighbourhood set of one discrete point comprises a number of discrete points of the next time step surrounding within a predetermined spatial window said one discrete point.

21. Method according to claim 1, wherein the predetermined neighbourhood set of the discrete points being element of the sink subset comprises the virtual sink location.

22. Method according to claim 1 comprising the further steps of measuring physical data at the number of discrete time steps and determining said occupancy probability distribution on the basis of said physical data.

23. Method according to claim 22, wherein the physical data are at least one image of a tracking area at each time step.

24. Method according to claim 1, wherein the set of discrete points is reduced on the basis of the occupancy probability distribution.

25. Method according to claim 24, wherein the reduction of discrete points is performed by removing the discrete points having in a predetermined spatio-temporal neighbourhood a maximum probability of presence of an object resulting from the occupancy probability distribution lower than a predetermined threshold.

26. Method according to claim 1, wherein the spatial space can be either the three dimensional space of objects or the two dimensional space of an image, wherein the image correspond to the physical data measured at each time step.

27. Tracking apparatus comprising:
- an interface for receiving occupancy probability distribution, wherein the occupancy probability distribution is the probability of presence of objects over a set of discrete points in the spatio-temporal space at a number of time steps;
- a modelling section storing a tracking model, wherein the tracking model comprises said set of discrete points, a virtual source location and a virtual sink location, wherein objects in the tracking model are creatable in the virtual source location and are removable in the virtual sink location;
- wherein the tracking model fulfils the following constraints;
- a created object is only allowed to move from the virtual source location to a source subset of the set of discrete points;
- an object is only allowed to move from each discrete point to a predetermined neighbourhood set of said discrete point, wherein the neighbourhood set comprises a subset of the union of the set of discrete points and the virtual sink location;
- an object is only allowed to move from a sink subset of the set of discrete points to the virtual sink location;
- the number of objects moving to each discrete point is equal to the number of objects moving away from this discrete point;
- the number of objects moving away from or moving to one discrete point is smaller than or equal to one;
- the number of objects moving from each discrete point to another discrete point is zero or positive; and
- any object created in the virtual source location eventually has to end up in the virtual sink location; and
- an trajectory estimator for estimating trajectories of objects by determining optimal solutions of the tracking model on the basis of said occupancy probability distribution.

28. Tracking apparatus according to claim 27, wherein a k-shortest path algorithm or a k-longest path algorithm is used for estimating the optimal solutions of the tracking model.

29. Tracking apparatus according to claim 28, wherein the trajectory estimator is determined by formulating the tracking model as a directed acyclic graph with the discrete points, the virtual sink location and the virtual source location as vertices and the allowed movements of the objects as directed edges which are weighted by cost functions and by finding the k shortest or k longest node-disjoint paths in this graph between the virtual source location and the virtual sink location, wherein k represents the number of objects being tracked in the model.

30. Tracking apparatus according to claim 29, the length of a k node-disjoint path between the virtual source location and the virtual sink location is the sum of the weights of the edges along these paths.

31. Tracking apparatus according to claim 29, wherein the cost functions of a subset of the edges depend on the occupancy probability distribution.

32. Tracking apparatus according to claim 31, wherein the edge between the discrete point i and the discrete point j∈N(i) where N(i) is the neighbourhood set of the discrete point i and, if there is an edge between the discrete point i and the virtual sink location v sin k, the edge between the discrete point i and the virtual sink location v sin k is weighted by the cost function being based on the term $$\log\left(\frac{\rho_i}{1-\rho_i}\right)$$

where $\rho_i$ is the probability of presence of an object at the discrete point i=1, . . . , L resulting from the occupancy probability distribution.

33. Tracking apparatus according to claim 32, wherein the cost function is directly proportional to $$-\log\left(\frac{\rho_i}{1-\rho_i}\right)$$

and the trajectory estimator is determined by finding the k shortest node-disjoint paths between the virtual source location and the virtual sink location.

34. Tracking apparatus according to claim 33, wherein an estimator k* for the number of objects being tracked in the tracking model is determined on the basis of iteratively finding the k shortest node-disjoint paths starting from k=1 and stopping at k=l, when the length of the l shortest node-disjoint paths is greater than the length of the l−1 shortest node-disjoint paths, wherein estimator k* corresponds to l−1.

35. Tracking apparatus according to claim 32, wherein the cost function is directly proportional to $$\log\left(\frac{\rho_i}{1-\rho_i}\right)$$

and the trajectory estimator is determined by finding the k longest node-disjoint paths between the virtual source location and the virtual sink location.

36. Tracking apparatus according to claim 35, wherein an estimator k* for the number of objects being tracked in the tracking model is determined on the basis of iteratively finding the k longest node-disjoint paths starting from k=1 and stopping at k=l, when the length of the l longest node-disjoint path becomes smaller than the length of the l−1 longest node-disjoint paths, wherein the estimator k* corresponds to l−1.

37. Tracking apparatus according to claim 29, wherein the edges from the virtual source location to the source subset are weighted by a cost function equal to zero.

38. Tracking apparatus according to claim 27, wherein the trajectory estimator for solutions of the tracking model is based on the functions $$\left(\log\frac{\rho_i}{1-\rho_i}\right)$$

for the discrete points i=1, . . . , L, wherein L is the number of discrete points of the set of discrete points and $\rho_i$ is the probability of presence of an object at the discrete point i=1, . . . , L resulting from the occupancy probability distribution.

39. Tracking apparatus according to claim 38, wherein the trajectory estimator is determined by finding an $\vec{f}^* \in H$, which yields a maximum of a function being based on $$\sum_i \left[ \left( \log \frac{\rho_i}{1-\rho_i} \right) \cdot \sum_{j \in N(i)} f_{i,j} \right]$$

or a minimum of a function being based on $$\sum_i \left[ -\left( \log \frac{\rho_i}{1-\rho_i} \right) \cdot \sum_{j \in N(i)} f_{i,j} \right],$$

wherein H is the set of feasible solutions $\vec{f}$ of the tracking model, $\vec{f}$ is a vector of variables $f_{i,j}$ with i=1, . . . , L and $f_{i,j}$ is the number of objects moving from discrete point i to discrete point j and N(i) is the neighbourhood set of the discrete point i.

40. Tracking apparatus according to claim 39, wherein the constraints of the tracking model are considered by the following formulas $$\forall i, j, f_{i,j} \geq 0$$

$$\forall i, \sum_{j \in N(i)} f_{i,j} \leq 1$$

$$\forall i, \sum_{j \in N(i)} f_{i,j} - \sum_{n: i \in N(n)} f_{n,i} \leq 0$$

$$\sum_{j \in N(v_{source})} f_{v_{source},j} - \sum_{n: v_{sink} \in N(n)} f_{n,v_{sink}} \leq 0,$$

wherein $N(v_{source})$ is the source subset, $\{n | v_{sink\ k} \in N(n)\}$ is the sink subset, $f_{v_{source},j}$ is the number of objects moving from the virtual source location $v_{source}$ to the discrete point j of the source subset and $f_{n,v_{sink\ k}}$ is the number of objects moving from the discrete point n to the virtual sink location $v_{sink\ k}$.

41. Tracking apparatus according to claim 40, wherein a continuous linear program solver is used for finding $\vec{f}*$.

42. Tracking apparatus according to claim 39, wherein a k-shortest path algorithm or a k-longest path algorithm is used for finding $\vec{f}*$.

43. Tracking apparatus according to claim 27, wherein the source subset comprises all the discrete points corresponding to the first time step.

44. Tracking apparatus according to claim 27, wherein the sink subset comprises all the discrete points corresponding to the last time step.

45. Tracking apparatus according to claim 27, wherein the source subset and the sink subset comprise a predetermined subset of the set of discrete points.

46. Tracking apparatus according to claim 27, wherein the predetermined neighbourhood set of one discrete point comprises a number of discrete points of the next time step surrounding within a predetermined spatial window said one discrete point.

47. Tracking apparatus according to claim 27, wherein the predetermined neighbourhood set of the discrete points being element of the sink subset comprises the virtual sink location.

48. Tracking apparatus according to claim 27 comprising a detector for measuring physical data at the number of discrete time steps and determining said occupancy probability distribution on the basis of said physical data and for giving said occupancy probability distribution to the trajectory estimator.

49. Tracking apparatus according to claim 48, wherein the physical data are at least one image of a tracking area at each time step.

50. Tracking apparatus according to claim 27, wherein the set of discrete points is reduced on the basis of the occupancy probability distribution.

51. Tracking apparatus according to claim 50, wherein the reduction of discrete points is performed by removing the discrete points having in a predetermined spatio-temporal neighbourhood a maximum probability of presence of an object resulting from the occupancy probability distribution lower than a predetermined threshold.

52. Tracking apparatus according to claim 27, wherein the spatial space can be either the three dimensional space of objects or the two dimensional space of an image, wherein the image correspond to the physical data measured at each time step.

53. A non-transitory computer readable medium for instructing a processor to perform the method of claim 1.

* * * * *

UNITED STATES PATENT AND TRADEMARK OFFICE
CERTIFICATE OF CORRECTION

PATENT NO. : 8,615,107 B2  Page 1 of 1
APPLICATION NO. : 13/348331
DATED : December 24, 2013
INVENTOR(S) : Francois Fleuret et al.

It is certified that error appears in the above-identified patent and that said Letters Patent is hereby corrected as shown below:

In the Claims:

In claim 39, at column 23, line number 15, change "and $\phantom{xx} f_{i,j}$ is the number of objects moving from discrete" to -- and $j \in N(i)$, $f_{i,j}$ is the number of objects moving from discrete --.

Signed and Sealed this
Second Day of December, 2014

Michelle K. Lee
*Deputy Director of the United States Patent and Trademark Office*